United States Patent
Royer et al.

(10) Patent No.: US 6,845,906 B2
(45) Date of Patent: Jan. 25, 2005

(54) SYSTEM AND METHOD FOR SELECTING FINANCIAL SERVICES

(75) Inventors: Coby Royer, St. Louis, MO (US); David Armes, Phoenix, AZ (US); Bill Schwarz, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/707,614

(22) Filed: Dec. 24, 2003

(65) Prior Publication Data

US 2004/0155101 A1 Aug. 12, 2004

Related U.S. Application Data (63) Continuation-in-part of application No. 10/318,438, filed on Dec. 13, 2002, now Pat. No. 6,685,088.

(51) Int. Cl.⁷ .............................................. G06K 5/00
(52) U.S. Cl. ..................................... 235/379; 235/380
(58) Field of Search ................................ 235/375, 379, 235/380, 381, 382, 382.5; 705/1, 71, 72, 10, 42, 65

(56) References Cited

U.S. PATENT DOCUMENTS

| 3,750,828 A | 8/1973 | Constable |
| 4,186,871 A | 2/1980 | Anderson et al. |
| 4,386,266 A | 5/1983 | Chesarek |
| 5,771,282 A | 6/1998 | Friedes |
| 5,884,271 A * | 3/1999 | Pitroda .......................... 705/1 |
| 6,405,182 B1 * | 6/2002 | Cuervo ......................... 705/43 |
| 6,685,088 B1 * | 2/2004 | Royer et al. ................. 235/380 |
| 2002/0055848 A1 | 5/2002 | Jae et al. |
| 2002/0120583 A1 | 8/2002 | Keresman et al. |
| 2002/0198882 A1 | 12/2002 | Linden et al. |
| 2003/0050891 A1 | 3/2003 | Cohen |
| 2003/0088429 A1 | 5/2003 | Schmeling et al. |

* cited by examiner

Primary Examiner—Karl D. Frech
Assistant Examiner—Daniel A. Hess
(74) Attorney, Agent, or Firm—Snell & Wilmer L.L.P.

(57) ABSTRACT

A system and method is disclosed which enables a consumer to use a PIN biometric, merchant code or other indicia to conveniently instruct a financial institution to activate or access specific financial services or accounts during a particular time period or during a particular transaction. When making a purchase, the cardholder enters account information into a remote terminal such as a POS device, then the cardholder inputs a particular PIN or biometric which is communicated to the financial services provider. The provider interprets the PIN or biometric as an instruction to access or activate a particular service.

7 Claims, 5 Drawing Sheets

FIG. 5

SYSTEM AND METHOD FOR SELECTING FINANCIAL SERVICES

CROSS REFERENCE TO RELATED APPLICATIONS

This application is a continuation-in-part of, and claims priority to, U.S. patent application Ser. No. 10/318,438 filed on Dec. 13, 2002 now U.S. Pat No. 6,685,088 with inventors David Armes and Coby Royer, the entire contents of which is hereby incorporated by reference.

FIELD OF INVENTION

The present invention relates generally to financial services, and more particularly, to a system and method which enables a PIN, card or selecta-card number to activate certain financial services or access several transaction accounts, wherein each transaction account may be identified by a unique indicia, e.g., an account identification ("AI") number.

BACKGROUND OF INVENTION

The proliferation of plastic transaction cards, which typically allow the cardholder to pay with credit rather than cash, started in the United States in the early 1950s. Initial transaction cards were often restricted to select restaurants and hotels and were often limited to an exclusive class of individuals. Since their introduction, the use of transaction cards have rapidly proliferated from the United States, to Europe, and then to the rest of the world. Transaction cards are not only information carriers, but also typically allow a consumer to pay for goods and services without the need to possess or distribute cash. Moreover, if a consumer needs cash, many transaction cards allow access to funds through an automatic teller machine (ATM).

Stored value cards, charge cards and credit cards are examples of transaction cards that can be used to provide cash equivalent value within an existing payment/transaction infrastructure. Stored value cards are frequently referred to as prepaid or cash cards, in that money is deposited in the account associated with the card before use of the card is allowed. For example, if a cardholder deposits ten dollars of value into the account associated with the card, the card can be used for payments up to ten dollars. In contrast, credit cards are backed not by cash, but by a line-of-credit that has been issued to the cardholder by a financial institution. As such, upon use of the credit (or charge) card, the cash payment from the cardholder is required after the purchase from the merchant, namely, when the cardholder is billed for using the line-of-credit associated with the card.

Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in the need for companies to differentiate their cards from competitor's cards. Moreover, due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As a result, consumers are possessing more transaction cards, using them with a variety of service establishments and for a variety of transaction events. As such, consumers usually possess multiple transaction cards for multiple purposes, with many consumers carrying five, ten or even more transaction cards while shopping. However, consumers are becoming increasingly frustrated with the inconvenience of having to carry multiple cards. Thus, there is a need within the transaction card industry to have a single card that can be used with multiple accounts.

Moreover, financial services companies are offering an increasing number of services to their consumers, including, for example, email notifications, biometric authorization, use of certain transaction cards or accounts at certain merchants, and customized spending limitations. However, consumers may not need to use all of the services for each transaction. As such, a need exists for enabling a consumer to conveniently instruct a financial institution to access or activate specific services during a particular time period or during a particular transaction.

SUMMARY OF INVENTION

The present invention relates generally to a single transaction card that can be used for multiple transaction accounts, wherein the selecta-card number located on the transaction card, often associated with a debit card network, is used in conjunction with an account identification ("AI) number to identify one of several associated transaction accounts. In one exemplary embodiment, the selecta-card provider is a financial institution which hosts both the selecta-card transaction processor for associating multiple accounts, and an internal transaction processor for accessing multiple pre-defined transaction accounts during a transaction event.

In another exemplary embodiment, the selecta-card provider comprises a selecta-card transaction processor that interfaces with external financial institutions which host various transaction accounts for the cardholder. In this embodiment, the selecta-card processor receives the card number and the AI number associated with a particular cardholder transaction account. The selecta-card transaction processor translates this information into the native transaction account information for processing. Using an existing card processing network, the transaction card information is processed according to existing card network standards.

Still another exemplary embodiment encompasses both internal and external transaction account functionalities, allowing a selecta-card provider, which offers transaction account services, to access third party institution accounts associated with the selecta-card provider transaction card. The present invention also relates to enabling a consumer to use a PIN biometric, merchant code or other indicia to conveniently instruct a financial institution to activate or utilize specific financial services or accounts during a particular time period or during a particular transaction. The financial services may include, for example, selecting a particular account or transaction card, payment instructions, notification instructions, security notifications, specific merchant rules, merchant category rules, geographic rules, expenditure rules or limits, and time or transaction limitations. When making a purchase, the cardholder enters account information into a remote terminal such as a POS device, then the cardholder inputs a particular PIN or biometric which is communicated to the financial services provider. The provider interprets the PIN or biometric as an instruction to access or activate a particular service.

BRIEF DESCRIPTION OF DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and.

Other aspects and features of the present invention will be more fully apparent from the detailed description that follows.

DETAILED DESCRIPTION

The present invention overcomes the problems of the prior art by facilitating the process whereby a single card number ("selecta-card number") may be used by the cardholder to access multiple transaction accounts. Used in conjunction with the selecta-card number, a consumer is able to select which account to use in a transaction event by communicating an account identification ("AI") number to an appropriate service establishment, financial institution, and/or third party provider.

The following descriptions are of exemplary embodiments of the invention, and are not intended to limit the scope, applicability or configuration of the invention in any way. Rather, the following descriptions are intended to provide convenient illustrations for implementing various embodiments of the invention. As will become apparent, various changes may be made in the function and arrangement of the elements described in these embodiments without departing from the spirit and scope of the invention. Accordingly, exemplary embodiments and aspects of the present invention are illustrated in FIGS. 1–5.

To facilitate a better understanding of exemplary components of the present invention, the following definitions and terms are provided.

Account Identification Number (AI)—includes any device, code, number, letter, symbol, digital certificate, smart chip, digital signal, analog signal, biometric or other identifier/indicia suitably configured to identify one or more transaction accounts.

Application Programming Interface (API)—includes a software interface that allows a computer program to invoke another computer program, subsystem, component, library, service, etc.

Financial Institution—includes a bank or other institution that offers specific financial instruments used within the invention, such as a credit card, charge card, or debit card.

Card Not Present Transaction—includes a card transaction where the SE and/or financial institution consider a card to be absent and for which a corresponding discount rate is charged. It should be appreciated that systems and methods of this invention may be used to facilitate both card present transactions or card not present transactions. In that regard, the term "cardholder" as used herein should not be limited to a person or entity possessing a physical card; rather, the cardholder may conduct transactions without a physical card and only account information.

Card Present Transaction—includes a card transaction where the SE and/or financial Institution consider a card to be present and for which a corresponding discount rate is charged.

Processing Network—includes a network over which, inter alia, debit, credit, charge and/or other transactions are conducted and to which are connected one or more account information input devices (e.g., card readers) and one or more credit and/or debit card institutions. Examples are Interlink, VISA, MasterCard, and American Express. Processing Network should be understood to include any network which facilitates any type of transaction.

Card Reader—includes any device configured to read debit, credit, charge or other transaction cards, and which interfaces to a card processing network. When capable of reading debit cards, it typically contains a PIN entry keypad. Card reader also includes any other computerized device configured to receive any form of a selecta-card number.

Charge Card—includes any financial instrument that supports substantially real-time, network mediated, currency transfers, typically in support of the purchase of services and products at the POS.

Charge Servicer—includes a transaction servicer that supports charge card transactions.

Credit Card—includes any financial instrument that supports network mediated currency transfers, typically in support of the purchase of services and products at the POS, and for which there is an associated delay in transfer, and discount rate charged to the SE.

Credit Servicer—includes any transaction servicer that supports credit card transactions.

Debit Card—includes any financial instrument that supports substantially real-time, network mediated, currency transfers, typically in support of the purchase of services and products at the POS, and for which there is a transaction fee.

Debit Gateway—includes any system that attaches to a proprietary network and system as well as a card processing network and which conducts transactions in a way similar to a debit card reader, except that the card is not generally present, and the card information originates from the proprietary network and system.

Debit Servicer—includes any transaction servicer that supports debit card transactions.

Internal Network—includes any proprietary network within an institution, over which transactions may be routed, as in the routing of a transaction between a transaction system and a transaction servicer, payment gateway, and/or debit gateway.

Payment Gateway—includes any system that attaches to a proprietary network and system as well as a card processing network and which conducts transactions in a way similar to a card reader, except that the card is not present, and the card information originates from the proprietary network and system.

POS—includes the general location where the sale or other transaction takes place.

Selecta-card Provider—includes any entity that offers the selecta-card service and/or card to consumers by use of a selecta-card Transaction Processor, which may be in combination with other internal transaction systems.

SE—includes any service establishment such as a product or service retailer or merchant that accepts a debit, credit, charge or other transaction card.

Selecta-card Number—includes any device, code, number, letter, symbol, digital certificate, smart chip, digital signal, analog signal, biometric or other identifier/indicia suitably configured to allow the consumer to interact or communicate with the system, such as, for example, account number authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The selecta-card number may be distributed and stored in any form of plastic, electronic, magnetic, radio frequency, wireless, audio and/or optical device capable of transmitting or downloading data from itself to a second device. A selecta-card number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Selecta-card Transaction Processor—includes an exemplary subsystem of a Selecta-card provider that supports the selecta-card service and which generally comprises a debit servicer, and one or more payment and/or debit gateways, which may be in communication with an internal and/or external network.

Transaction Servicer—includes a system that generally communicates with a proprietary network and system, as well as a card processing network; and which facilitates transactions that are initiated by, inter alia: a card reader, payment gateway, or debit gateway.

Voice Response—includes a capability or system that employs a Voice Response Unit to support interaction with a person via telephone, typically employing VR menus that enable navigation to other menus and ultimately allow the person to enter information, request actions, and/or retrieve information.

Figure 1:
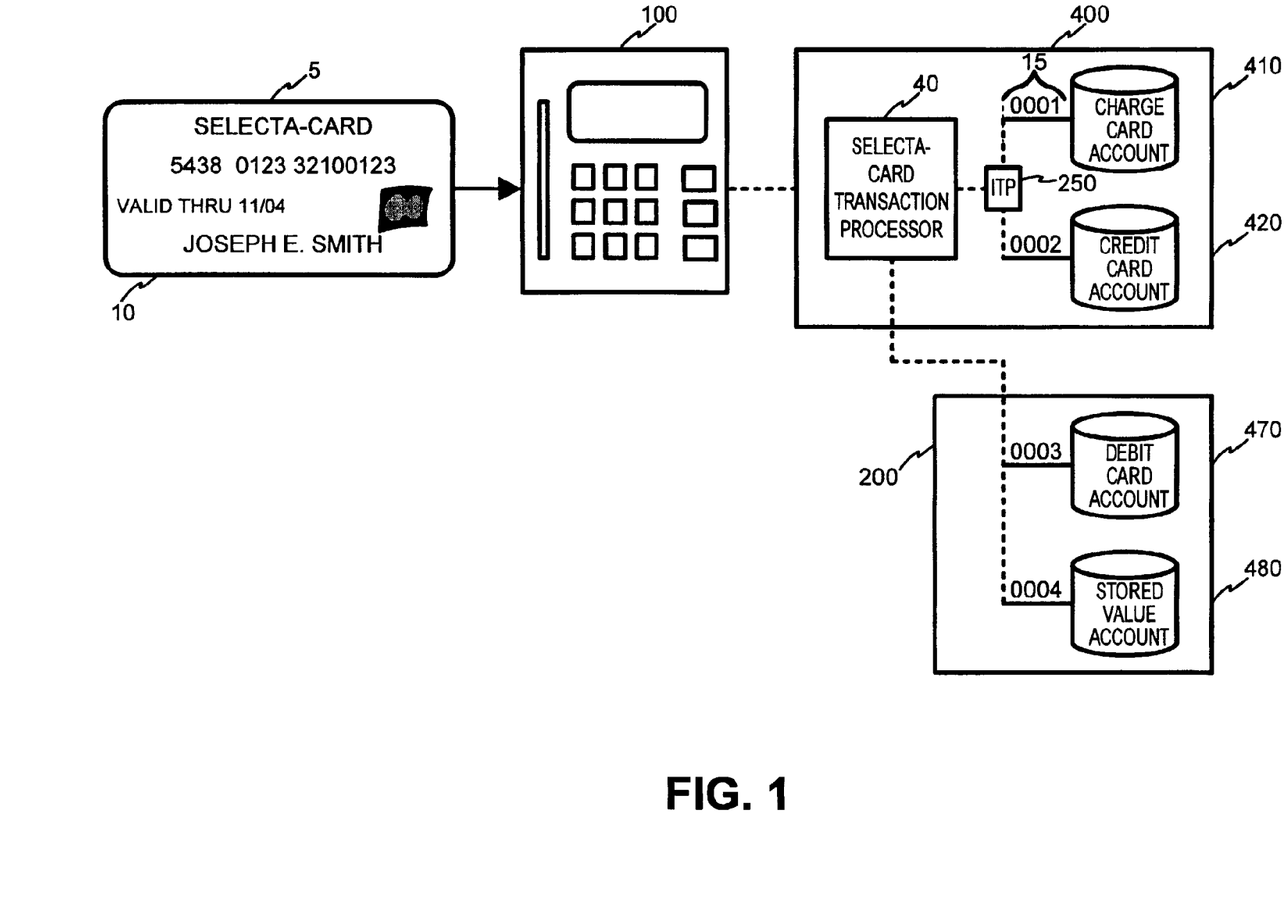
FIG. 1 illustrates an overview of an exemplary system of the present invention utilizing a selecta-card number in conjunction with account identification numbers to identify various cardholder accounts.

With reference to an exemplary system shown in FIG. 1, a selecta-card 5 is shown having a selecta-card number 10 embossed thereon. The selecta-card 5 looks, feels and functions as an ordinary transaction card, e.g., charge card. In an alternative embodiment, an existing transaction card may be utilized as a selecta-card 5. However, it should be appreciated that although a physical selecta-card 5 is shown, no physical card is necessary. Indeed, the selecta-card number 10 shown on selecta-card 5 may be any number or other indicia, whether or not embodied in a tangible media.

In an exemplary embodiment, the selecta-card 5 is configured to communicate with a card reader 100, e.g., ATM, point of sale (POS), or other computerized device or terminal, to transmit the selecta-card number 10 through a card processing network, e.g., debit network, to a selecta-card provider 400. As will be described in greater detail later, the cardholder may have multiple transaction accounts, which may be either maintained in one financial institution or may be distributed among many financial institutions. In an exemplary embodiment, each of the cardholder's transaction accounts are associated with separate account identification (AI) numbers 15. In an exemplary embodiment, the cardholder swipes the selecta-card 5 through a card reader 100, e.g., POS terminal. The POS terminal reads the selecta-card number 10, recognizes the selecta-card 5, and prompts the cardholder for the AI number 15.

The cardholder enters the appropriate AI number 15 corresponding to the account to which cardholder desires to use. As one skilled in the art will appreciate, entering the AI number may include entering the number into a keypad, selecting an icon or button corresponding to the AI number, swiping the magnetic stripe on different sides corresponding to a different AI number, providing a different biometric to activate a particular AI number, any combination of the foregoing input methods and/or any other means or method for inputting the AI number into the system. For example, as shown in FIG. 1, if the cardholder desired to use his charge card account 410, the cardholder would enter his AI number 15 "0001." In this embodiment, the cardholder has four accounts, where charge card account 410 and credit card account 420 are internal to the selecta-card provider 400, accessible through an internal transaction processor 250; along with a debit card account 470 and stored value account 480 maintained by an external financial institution 200, which is external to the selecta-card provider and accessible through a card processing network.

Figure 2:
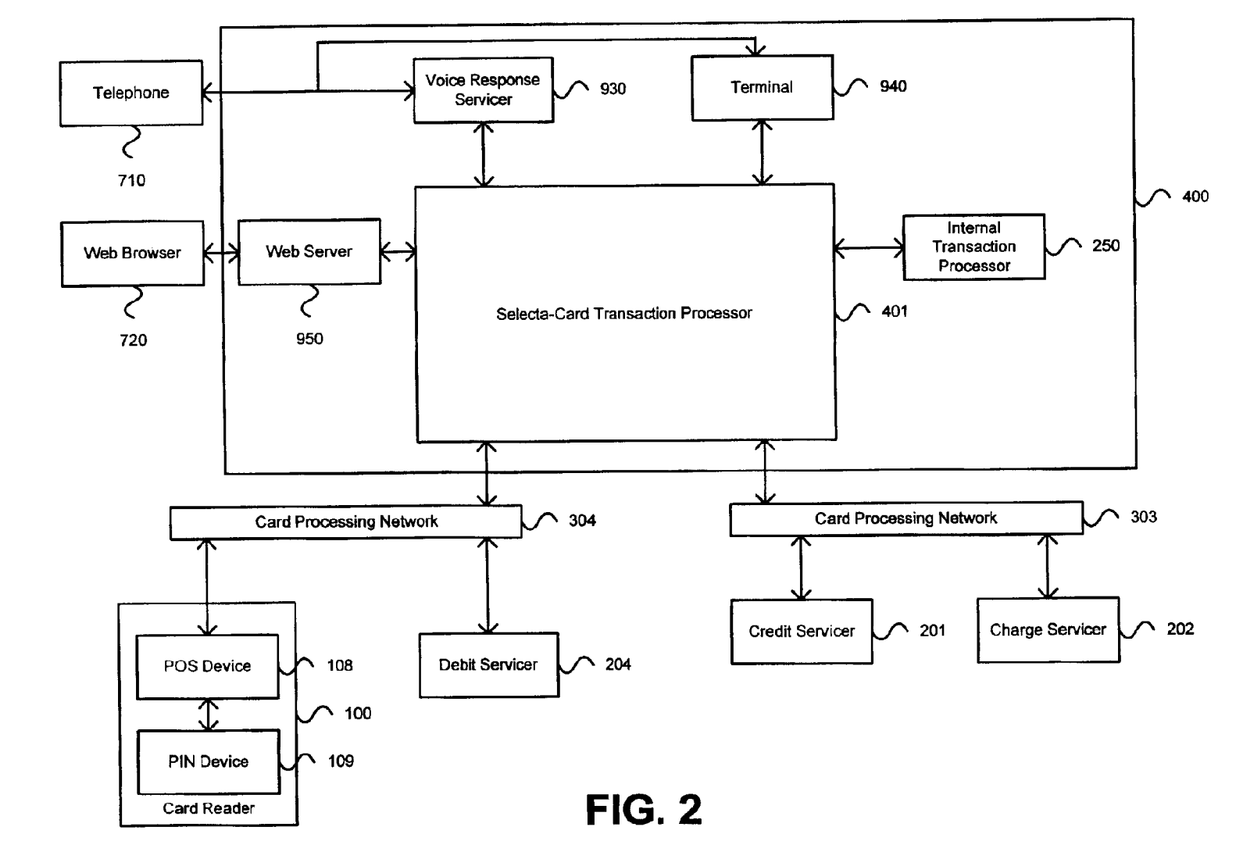
FIG. 2 is a schematic illustration of exemplary interfaces and networks in communication with a selecta-card transaction processor.

As shown in FIG. 2, an exemplary system and network configuration of the present invention includes a selecta-card provider 400 comprising a selecta-card transaction processor 400 (and optionally an internal transaction processor 250), one or more user interface systems, e.g., web server 950, voice response servicer 930; and/or a customer service terminal 940; one or more card processing networks 303 or 304; a credit servicer 201; charge servicer 202; debit servicer 204; and/or the like; and a card reader 100, which generally includes a POS device 108 and/or a PIN device 109.

In one embodiment, the cardholder may associate various transaction accounts with the card number online. Examples of such elements, as shown in FIG. 2 are a web browser 720 connected to a web server 950 that provides forms for maintenance of selecta-card associations and/or a telephone 710 connected to a voice response unit 930 that is capable of decoding spoken or DTMF touchpad tones that the cardholder enters in response to questions that support the maintenance of selecta-card associations. Another example is a terminal, such as a computer workstation, or IBM 3270 style terminal, or any other type of display and input device, with which a selecta-card provider service representative can perform maintenance of selecta-card associations, presumably in response to verbal or written correspondence with the cardholder, as might occur over the telephone at an inbound call processing center. Any combination of elements can be used to create, maintain, and/or delete associations.

Various exemplary embodiments are contemplated by this invention. In one exemplary embodiment, as depicted in FIG. 2, the invention includes appropriate gateways to communicate with external transaction servicers via a card processing network 303 or 304 to service, for example debit, charge, or credit card accounts. Additionally, an internal transaction processor 250 is disclosed, wherein the internal processor 250 is part of the selecta-card provider system and is configured to process card transactions internally.

Figure 3:
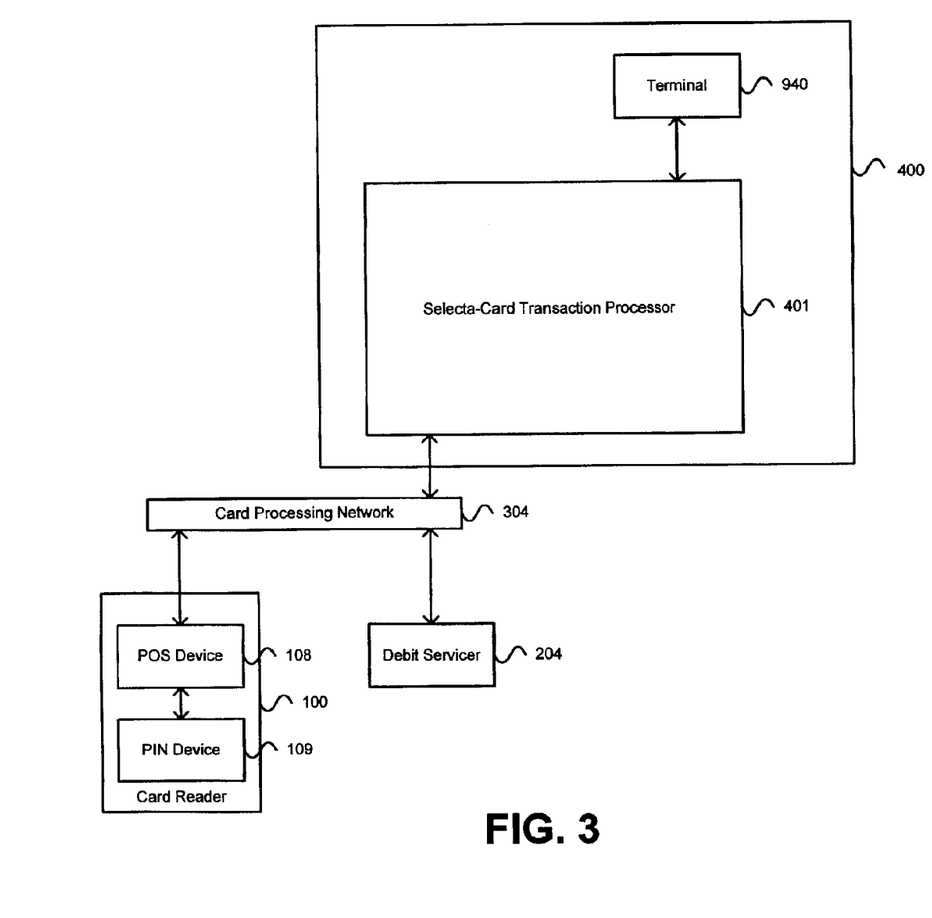
FIG. 3 is a schematic corresponding to a selecta-card provider in communication with an external card service and not internal card service configuration in accordance with an exemplary embodiment.
Figure 4:
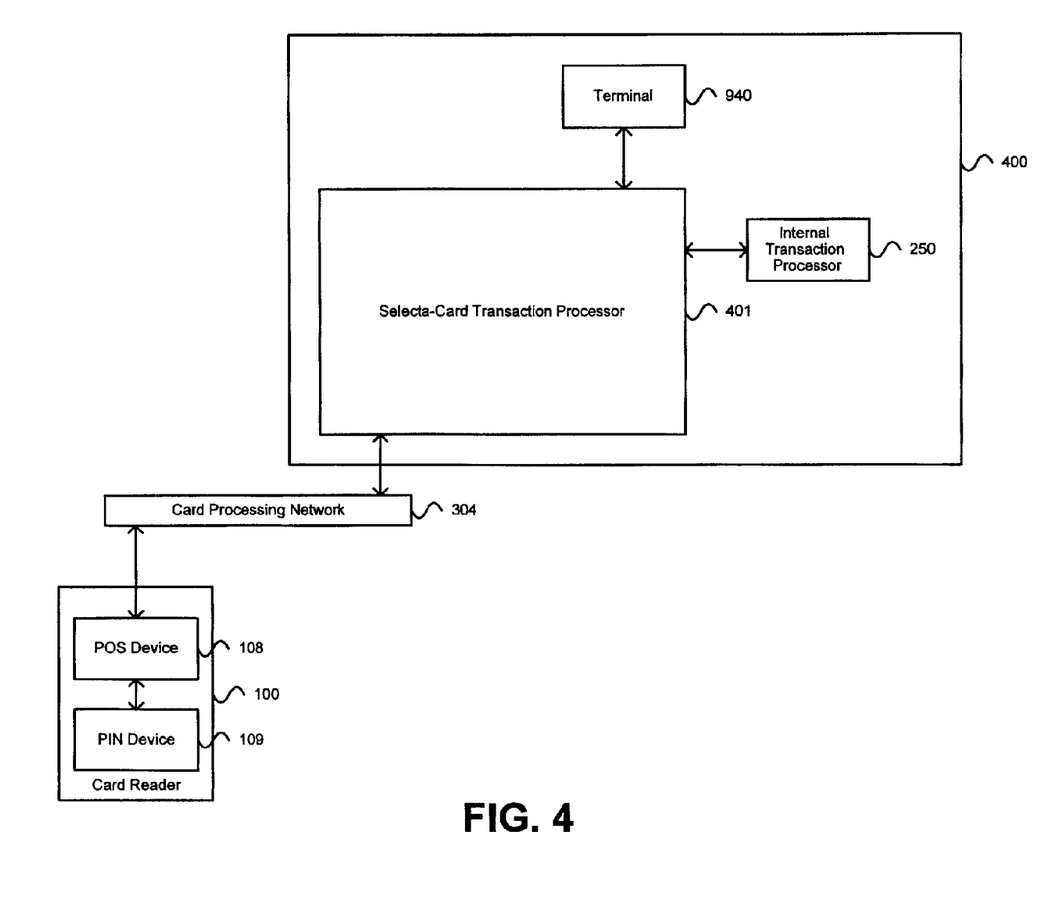
FIG. 4 is a schematic corresponding to a selecta-card provider with an internal transaction processor configured for internal card service in accordance with an exemplary embodiment.
Figure 5:
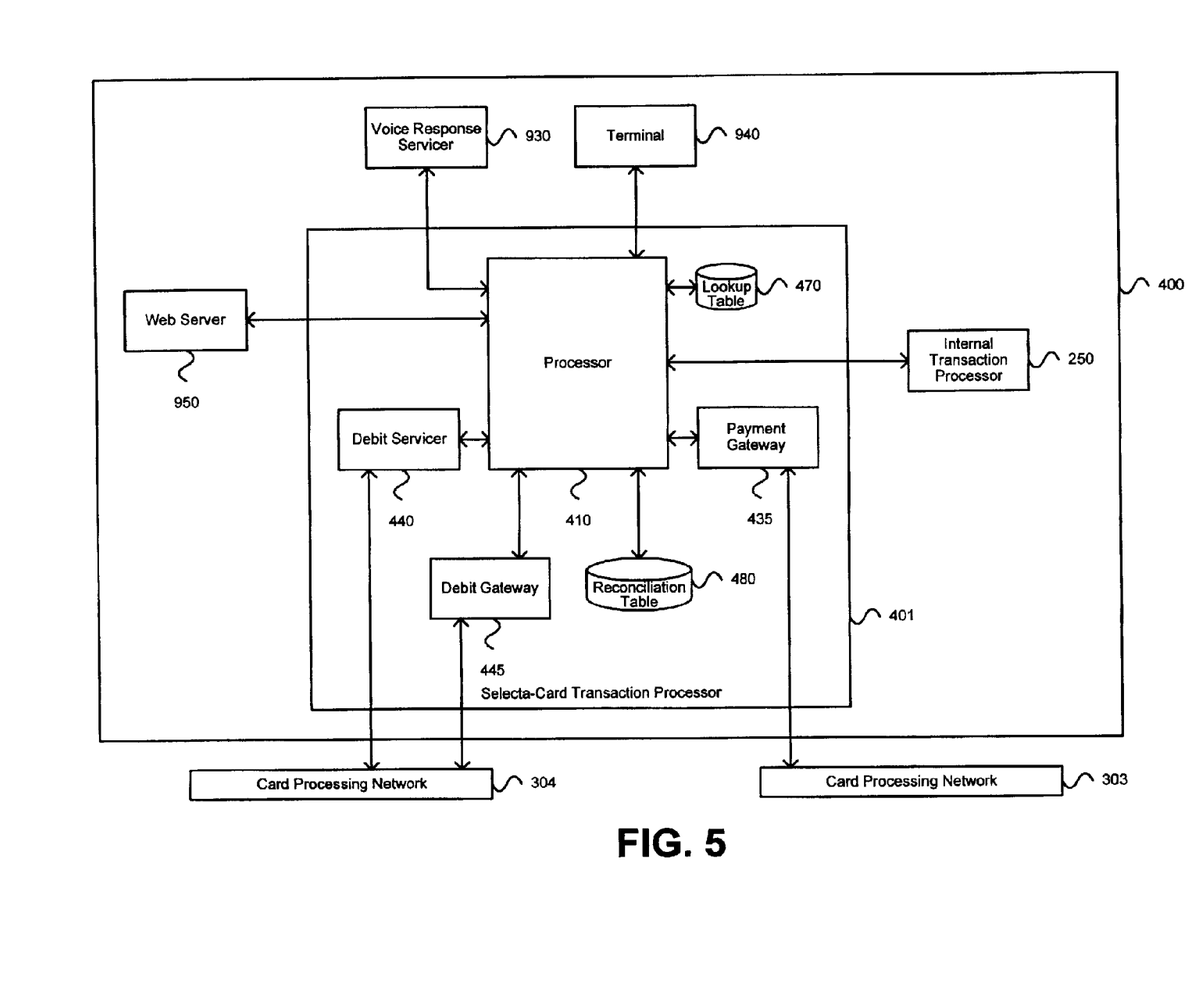
FIG. 5 is a more detailed schematic of exemplary components of the selecta-card transaction processor.

In the exemplary embodiment depicted in FIG. 3, the selecta-card system is shown without the internal transaction processor shown in FIGS. 2, 4 and 5, and is configured specifically to support external transaction accounts, i.e., those not maintained and hosted by the selecta-card provider. As such, one or more debit servicers 204 may facilitate the processing of transaction accounts not provided by the selecta-card provider.

In another exemplary embodiment, where the selecta-card number 10 is associated with transaction accounts that are serviced by the subsystems that are internally accessible within the selecta-card provider 400, an internal transaction processor 250 is utilized. As such, the architecture shown in FIG. 4 depicts an internal transaction processor 250. In this embodiment, one or more transaction accounts are associated with a cardholder's selecta-card number 10. One or more internal transaction processors 250 service the transaction accounts. Transaction processors 250 may facilitate credit transactions, charge transactions, debit transactions, or other kinds of transactions, e.g., stored value transactions such as those involving frequent flyer rewards.

In light of the above-mentioned definitions and overview of exemplary system configurations, a more detailed description of exemplary components and processes of the present invention is now described, wherein steps for enrolling cardholders, associating transaction accounts to AI numbers 15, and using the selecta-card to facilitate transaction events is contemplated.

Enrollment in the selecta-card system and subsequent maintenance of the selecta-card account generally comprises elements to facilitate the creation, modification, and deletion of the associations of the selecta-card 5 to one or more transaction accounts. Enrollment establishes a selecta-card, account for a cardholder and results in her possession of a selecta-card 5 that is ready for card use. In an exemplary embodiment, a cardholder applies for the selecta-card 5 using one or more of a variety of mechanisms, such as submission of an on-line form, mail of a paper form, telephone conversation with cardholder service representative, and/or telephone interaction with voice response unit.

If the mechanism involves a cardholder service representative, then the cardholder service representative enters information into terminal 940. Otherwise, cardholder uses telephone 710 or web browser 720. If cardholder uses web browser 720, then web browser 720 interacts with web server 950. It should be appreciated that any number of means may be used to communicate enrollment data to the selecta-card transaction processor 401. The enrollment information provided by the cardholder generally includes appropriate identifying information (e.g., name, addresses, social security number, etc.) so that initial fraud screening and credit determination can be performed. Processor 410 (FIG. 5) determines if the cardholder is to be provided a selecta-card.

If the cardholder is to be provided a selecta-card, then processor 410 initiates card issuance so that the cardholder will be sent the appropriate plastic card containing a magnetic stripe, smart chip, embossed numbers, and/or the like. The plastic card may be considered a debit card, in that it will later operate similarly to a debit card. In an alternative embodiment, as previously noted, the cardholder does not receive a plastic card; rather, the cardholder only receives a number, digital certificate, or other suitable identification indicia, which may be used online, for example, to facilitate an online transaction event.

In one embodiment, as shown in FIG. 5, the system comprises a lookup table 470 which may be pre-loaded with information about associated transaction accounts, wherein this information may have been previously provided during enrollment. The system may also store cardholder specific information that was provided during enrollment, or which was obtained from other sources, such as, for example: name, address, phone number, selecta-card number, and activation information, etc. This information may be stored in a cardholder information table. The system may also store transaction details, which would be initialized during enrollment to contain no transaction records. This information is stored in a transaction record table.

After the cardholder receives the selecta-card 5, activation may be desired before use of the selecta-card 5 is permitted. Activation may be facilitated by any number of suitable means, for example: calling a cardholder service representative, calling a voice or touch-tone response system, accessing a web site, or any other mechanism in order to provide information about the card and/or cardholder so that the selecta-card provider 400 has reasonable certainty that the card was received by the intended cardholder. In an exemplary embodiment, the cardholder calls from their home phone number of record, providing an activation code or account number that was delivered with the selecta-card in the mail, possibly in combination with other identifying information such as social security number. The activation mechanism may also obtain information not provided directly by the cardholder by utilizing the communication device used by the cardholder for activation. For example, the activation mechanism may obtain further information from a telephone caller ID or Internet TCP/IP routing or address. After activation, the cardholder may proceed to the steps of card use and/or association of accounts.

Cardholders who are provided with a selecta-card 5 may also be provided with authentication credentials for identity verification during subsequent processes such as Add Association, Edit Association, Delete Association, and Termination. In an exemplary system, the enrolled cardholder is given an ID and password to be used upon subsequent access to the selecta-card web site in order to gain access to screens that support selecta-card processes. In an alternative embodiment, the cardholder may be prompted to select a password, or answer a secret question, where this information can be used during any or all of the mechanisms for providing information and requesting processes.

The cardholder communicates information to the selecta-card processor 401 through one or more of a variety of mechanisms such as submission of on-line form, mail of a paper form, telephone conversation with cardholder service representative, or telephone interaction with voice or touch-tone response unit. The cardholder may be required to provide authentication credentials before proceeding with this process. In an exemplary embodiment, if the cardholder accesses and logs-in to a web site, an ID and password may be required, or an ID and password may be provided for subsequent use at the site, for example, in creating associations. The information provided by the cardholder generally includes: the account number of the transaction account to be associated and an AI number 15, and may also include other information such as the name, expiration date, billing address, and other identifying information associated with the particular transaction account.

This information is processed by processor 410 (FIG. 5) to ensure validity and support for the desired transaction account. If supported, then processor 410 adds an association record to the lookup table 470. In an exemplary embodiment, lookup table 470 is a relational database such as Oracle, Sybase, IBM DB2, Microsoft SQL Server, etc., however, it may be any suitable storage system that resides in computer memory, magnetic disk storage, etc., and which optionally includes a database application service that is invoked by database access APIs which might comply with an established standard data access protocol such as SQL. The association record includes some or all of the information provided by the cardholder and may optionally include additional information that is obtained from other sources. In an exemplary embodiment, the association record stores the AI number, selection card number and/or the account number of the associated transaction account.

The "add association" step allows the cardholder to create a new association of a transaction account to the selecta-card for which she has enrolled and which has been received. In an exemplary embodiment, the cardholder logs on as described above and is authenticated. The cardholder, upon entering his selecta-card number, selects the "add association" feature, wherein, depending on whether the transaction accounts to be added are internal or external to the selecta-card provider, the cardholder is queried for additional information. When the cardholder transaction account to be added is internal, the cardholder is queried for the desired transaction account and the cardholder-specified AI number 15 to associate with the specified transaction account. Upon entering the desired transaction account and a suitable AI number 15, the selecta-card is then suitably configured to be used for the specified transaction account, wherein the AI number 15 is the number associated with the added account. The selecta-card transaction processor look-up table 470 (FIG. 5) maintains the transaction account associations. When the desired transaction accounts to be added are external to the selecta-card provider 400, the add association step generally entails more information. For example, the transaction account number, name of issuing financial institution, address, and phone number are normally included.

An "edit association" process is also available which allows the cardholder to modify an existing association of a transaction account to the selecta-card. The cardholder communicates information to the selecta-card processor 401 through one or more of a variety of mechanisms as described above. The information that the cardholder communicates includes changes to existing information in the lookup table 470. For example, the cardholder may change the AI number 15 of an associated transaction account. In another example, a cardholder changes the billing address for a specific transaction account that is associated with the selecta-card. The processor 401 may optionally validate the new information that has been provided.

The "remove association" process allows the cardholder to remove an existing association of a transaction account to the selecta-card 5 for which she has enrolled and which has been received. The cardholder communicates information to the selecta-card processor 401 through one or more of a variety of mechanisms as described above. The information that the cardholder communicates generally includes some identification of the association to be removed, e.g., the associated AI number 15.

An embodiment of the present invention also contemplates the ability of the cardholder (or other authorized party) to terminate selecta-card privileges. A cancellation request is communicated from the cardholder to the selecta-card provider 400 by any standard means such as cardholder service call, VR call, web site interaction, etc. Alternatively, termination may be initiated by the selecta-card provider for a variety of reasons such as fraudulent activity, non-payment, etc. Enrollment data will be updated to reflect the termination of the selecta-card account or termination or removal of a particular transaction account or AI number 15. As such, the cardholder is no longer able to use the selecta-card 5 and/or the AI number 15 will be considered invalid by the selecta-card transaction processor and any attempt to use the card will be denied at the POS.

After a cardholder has successfully enrolled and received a selecta-card 5 with a selecta-card number 10, and after at least one association has been added or has been previously established, the cardholder may use the card for a transaction to purchase goods or services or to conduct any number of other transactions. To use the selecta-card 5, the cardholder initiates a transaction, e.g., purchase of goods or services, at a service establishment (SE) and proceeds to use the selecta-card 5 in the standard way in which said SE accepts PIN-based debit card transactions. In an exemplary embodiment, the SE has previously established a relationship with a card processing network, obtained card reader 100, established an account with a financial institution for receipt of payments, and properly set up and configured the card reader 100, account information for the SE, and/or other optional POS equipment such as a cash register. The amount of the purchase, plus optional additional information such as identification of the product or service, and merchant information, are also generally communicated to the POS device 108. This may occur automatically via an interface to another POS device such as cash register, or may be performed manually by the SE.

In one embodiment, to complete a transaction, the SE or cardholder swipes the selecta-card 5 through POS device 108 of card reader 100. Alternatively, the selecta-card 5 may be a smart card device which is placed into a smart card reader. Alternatively, the selecta-card card number 10 may be manually entered into POS device 108 by the SE. Additional embodiments contemplate situations where no physical cards are present; rather, only the selecta-card number 10 is used. These situations involve online transactions or other various card not present transactions. If card reader 100 is not a debit card reader, then POS device 108 optionally prompts the user to identify whether the card is a debit or charge card. The cardholder selects "debit card." In an exemplary embodiment, the procedure includes reading an alphanumeric display and pushing an appropriately labeled button on PIN device 109. POS device 108 and PIN device 109 may be distinct or the same, and may be contained in any number of physical devices interconnected appropriately by wires or other connections for exchange of information, power, etc.

POS device 108 optionally prompts the user to enter an AI number 15. Using PIN device 109, the cardholder enters the AI number 15 of a previously created association to the transaction account which the cardholder wishes to be the payment vehicle for this particular transaction. POS device 108 then establishes the necessary network connection to card processing network 304, which may require analog telephone dial up, exchange of authentication information, communication protocol handshaking, and encryption. For example, card processing network 304 may be Interlink, or a proprietary network maintained by a third party that can access other networks such as Interlink. POS device 108 may use information, such as the selection on "debit card" and/or the card number to send information to the correct processing network.

Once the connection from POS device 108 to card processing network 304 is established, the POS device 108 communicates the necessary transaction request information to the network in the appropriately encrypted format. This information generally includes, identification of the selecta-card, such as the selecta-card number 10, the AI number 15 entered by the cardholder, and currency amount of the transaction being requested. The SE is also identified in the transaction, where the SE identifying information may be established during the initial connection and/or during the communication of the transaction request information. Additional information may optionally be included in the communication such as a reference code that identifies this specific transaction between cardholder and SE.

Through the card processing network 304 and POS device 108, the transaction request is delivered to the selecta-card provider 400 in response to the selecta-card number 10. In an exemplary embodiment, recognition of the selecta-card provider is facilitated by a bank identification number (BIN) or another set of digits configured to identify the selecta-card provider. In an exemplary embodiment, the first 6 digits direct the routing to the appropriate card institution. As shown in FIG. 5, the selecta-card Transaction Processor 401 receives this request, which is processed by debit servicer 440. The selecta-card provider performs primary authorization, which is the authorization needed in order for the merchant to accept the selecta-card payment instrument. In the exemplary embodiment shown in FIG. 5, it should be noted that the debit servicer 440 is internal to the selecta-card Transaction Processor 401, whereas in FIG. 3, debit servicer 204 is external to the selecta-card provider 400. In FIG. 3, debit servicer 204 service requests from the selecta-card provider 400 and re-routes the requests externally after generating a new (or secondary) transaction request with the underlying (associated) selecta-card number 10 and AI number 15.

Debit servicer 440 communicates with processor 410, which optionally retrieves information from the cardholder information table in order to verify the validity of the selecta-card account and requested transaction. The selecta-card number 10 acts as an index into this table to support the retrieval. If the debit servicer 440 does not determine that the account or request are invalid, then it communicates with processor 410, which retrieves information from the lookup table 470. AI number 15 acts as an index into this table to support this lookup.

If the lookup fails to retrieve a record, then the debit servicer is informed that the request is to be denied, and the processor 410 optionally updates transaction record table to record the status of the transaction request. Primary authorization is thus rejected. If the lookup retrieves a record, but the status of the associated account is identified as invalid, then the debit servicer is informed that the request is to be denied, and the processor optionally updates the transaction record table to record the status of the transaction request. Primary authorization is thus rejected. If the lookup retrieves a valid record, the processor 410 inspects the associated transaction account number and other information retrieved from the lookup table 470 and determines how the transaction is to be routed.

If processor 410 identifies the transaction request as being serviced by an internal transaction processor 250, then some or all of the information contained in the request is forwarded to an internal transaction processor 250, along with some or all of the information from the retrieved lookup table 470 record. This information generally includes the amount of the requested transaction, the associated account number, and identification of at least one of the actual SE card reader 100 or the debit servicer 440. It may also include an AI number 15, and other information that identifies the transaction, SE, and/or cardholder.

Internal transaction processor 250 services the requested transaction in the same manner as if the transaction were received by a credit servicer, charge servicer, or debit servicer, in the manner of a conventional credit, charge, or debit institution. As such, it uses the account number, optional PIN (AI number 15), and other identifying information such as expiration date, name, address, etc., to initially validate the request. The internal transaction processor would then proceed with fraud, credit, and/or financial checks that may include any or all of the following which are meant to be illustrative and not restricting: request does not cause overdrawn account, request does not exceed line of credit, request does not trigger fraud rules, request does not trigger other transaction-precluding credit rules, etc. After meeting these and any other conditions including system availability, the requested transaction is accepted.

In an exemplary embodiment illustrated in FIG. 5, internal transaction processing for all types of transaction accounts proceed along one of two exemplary processing routes. In one embodiment, the desired transaction is communicated from SE card reader 100 to the selecta-card transaction processor 401. The selecta-card transaction processor 401 handles this request as a direct transaction, as long as the underlying transaction account is accepted as payment by the SE. For example, although a transaction may be initiated as a debit card transaction against the selecta-card provider 400, it may actually be executed as a charge card transaction (e.g., American Express charge card) with the SE as long as the merchant accepts the specific charge card, e.g., American Express. If the SE accepts the requested transaction account, e.g., American Express, and there are no other rules precluding a direct transaction, then the transaction can be handled by using the same processing and infrastructure as for a native transaction initiated by the underlying card on a conventional POS device, in this example, an American Express charge card. Although the transaction is initiated as a selecta-card transaction, the selecta-card provider 400 in this instance is also the institution that owns the account, and once the request is received, the request can be processed as though it was initiated by the associated account and not the selecta-card account. Optional additional details may be stored and/or printed in order for the merchant and cardholder to reconcile the different account numbers corresponding to the same transaction. Additional transaction details may optionally reflect the transaction as processed as a selecta-card transaction on the card reader 100. For example, the transaction record may bear two transaction IDs, one for the debit card communication and the other for the native transaction. "Native," as that term is generally used herein, is any transaction request that can be serviced by the selecta-card provider 400 without generating a new transaction request that is sent to a different institution, which facilitates the processing of associated account information. In an exemplary embodiment it is generally understood that "native" transactions are typically serviced internally, whereas "non-native" transactions are serviced externally.

If the internal transaction fails to meet the conditions to be processed as a native transaction, then the requested transaction is processed as a sequence of two transactions, that is, as a two-step transaction. The first step is a conventional debit transaction accommodated by the card processing network 304. In an exemplary embodiment, this step occurs with corresponding real-time exchange of funds between the financial institution of the selecta-card provider and the financial institution of the SE. The second step is accommodated by an appropriate internal transaction processor 250. The transaction involves debit, charge, credit, stored value, or other processing, and will proceed in the conventional fashion. Additional transaction details may optionally reflect the fact that the transaction was processed as a selecta-card transaction on the card reader 100. For example, the transaction record may bear two transaction IDs, one for the debit card communication and the other for the native transaction.

If processor 410 identifies the transaction request as being serviced by an external credit or charge card institution, then, depending on particular financial institution and/or SE requirements, some or all of the information contained in the request is forwarded to payment gateway 435, along with some or all of the information from the retrieved lookup table record. This information generally includes the amount of the requested transaction, the associated transaction account number, and may include identification of the actual SE card reader 100, the debit servicer 440, and/or the payment gateway 435. This information may also include an AI number 15, and other information that identifies the transaction, SE, and/or cardholder. If available, a reference code may also be included. In this type of processing, one of two exemplary routes accommodate the requested transactions. With no or little change to existing card institutions, the processing is handled as a two-step transaction. Alternatively, however, financial institutions may configure their systems in order to handle selecta-card transactions as native transactions. The next process step in handling external transaction requests is to determine if the requested financial institution has an arrangement to accommodate selecta-card transactions. If so, then the transaction is handled as a native external transaction.

If processor 410 determines that the external request is to be handled as a two-step transaction, then either the debit gateway 445 or payment gateway 435 are used to initiate the second transaction. Additional transaction details may optionally reflect the fact that the transaction was processed as a selecta-card transaction on the card reader 100.

If processor 410 determines that the external request is to be handled as native, then, the transaction information is forwarded to the appropriate financial institution through an appropriate communication mechanism e.g., debit gateway 445 or payment gateway 435. If not, then any agreed upon and implemented business-to-business transactional system might communicate the desired second transaction request. As before, the forwarding of a transaction request generally includes the actual SE card reader 100 or the debit servicer 440 in order to identify the SE, as well as the amount of the requested transaction, and the associated account number. At this point, secondary authorization begins. Secondary authorization is when the financial institution for the associated financial instrument is sent the request for the transaction.

Regardless of whether the transaction is handled as native vs. two-step and internal vs. external, the servicing system will return at minimum a status to reflect the success of the transaction. It may also return a transaction ID. This information is received by processor 410 from the originating system, which may be internal transaction processor 250, debit gateway 445, or payment gateway 435, or other, depending on the mechanism for transaction processing.

Processor 410 processes the transaction ID, status, and other information and formats a transaction response to return to the SE. This response may include identifying information about the underlying card institution and second transaction. It may include a transaction ID for the card processing network 304, and may also include a transaction ID for the underlying transaction. The final response, the secondary authorization, is sent from debit servicer 440 back to the card processing network 304, which then formats the primary authorization response to send back to the card reader 100.

Whenever a transaction is authorized, it is stored in the reconciliation table 480, which allows subsequent settlement to match authorization requests to settlement records. Since authorization only determines whether a charge will be allowed, but settlement actually effects the exchange of money in most cases, information must be stored in the reconciliation table 480, and includes at minimum, the selecta-card Number 10, the merchant ID, date, time, amount of charge, information such as card number to identify the associated payment instrument, reference code, and possibly transaction IDs, PIN, and other information.

At the SE, the card reader 100 will inform the SE and/or attached POS device such as cash register that the transaction was successful, and that the purchase of goods and/or services should be completed. A receipt is optionally printed for the cardholder. The receipt may optionally be printed with a signature request, in which case a signed copy will be retained by the SE and a cardholder copy, unsigned, will be provided to the cardholder. If the signature request is included, the card reader 100 or attached POS device may optionally prompt for a signature using a visual or other display. The SE may confirm receipt of signed copy before the final sale completes.

When the primary authorization information is returned to the merchant, it is stored in a settlement table in a POS device and/or attached systems for subsequent settlement that is typically used for actual clearance of charges for payment to the merchant by various card institutions. This primary authorization information consists of settlement records. In an exemplary embodiment, one settlement record exists for each authorized transaction. Alternative embodiments may store records differently, and also include records for non-authorized transactions. Primary authorization information may also be printed and/or stored onto other media in alternative embodiments.

The system for processing transactions for payment and billing is referred to as "settlement". At periodic intervals, typically at the conclusion of the SE business day, the SE initiates settlement, wherein settlement records are sent to the appropriate financial institution for payment (and in some cases credit) to merchant accounts. Settlement records can be sent using a plethora of mechanisms such as electronic submission over any computer network or by mail. The mechanism typically includes encryption and optionally other security such as digital signatures. If a settlement record contains information about the associated payment instrument, then that settlement record can be sent directly to the associated financial institution. When the settlement record contains only information about the selecta-card instrument, then the settlement record is submitted to the selecta-card institution.

When a settlement record is sent directly to the associated institution, then that institution can use its prearranged mechanism for performing financial adjustments that total to an amount equal to the sum of all transactions that are reconciled within the batch of settlement records that it receives. This may be by a direct payment to the SE, through a bank account, or other mechanism. Reconciliation is described below.

When a settlement record is sent to a selecta-card institution, then the selecta-card institution performs a secondary settlement to ensure that transactions are directed to the appropriate card institutions. This may occur in any of several ways. If the original transaction was native, then this can be performed internally. Otherwise, the settlement must be directed to an external card institution. If the selecta-card and external card institutions have a preexisting arrangement, then one mechanism for processing is to select settlement records that are for such an external card institution and forward directly to the external card institution for processing. Under this mechanism, the external institution can then perform direct settlement with the SE. Financial reports would be maintained and distributed by some combination of selecta-card and external card institution to track the submission and/or processing of these secondary direct settlement records to the external card institution. Processing of native transactions would occur by a similar mechanism, the only difference being the fact that the associated financial institution is really part of the same institution as the selecta-card institution.

Under some circumstances, for example when there is no prior arrangement between selecta-card and external card institution as described in FIG. 4, above, then secondary indirect settlement is performed. In this type of processing, two financial exchanges occur. Particularly, the selecta-card institution submits a set of secondary settlement records to the external card institution, the secondary settlement. These are processed in the conventional manner as though the selecta-card is an SE, resulting in payment from the external card institution to the selecta-card institution. The selecta-card institution also processes the primary settlement records and submits payment to the SE as the primary settlement. This two stage settlement is referred to as indirect settlement.

Regardless of the type of settlement that occurs, in an exemplary embodiment, the processing institution (selecta-card and/or external card institution) will perform reconciliation in order to match authorization requests to settlement records. Any or all of the information stored in the reconciliation table 480, or similar data store within the external card institution. For example, this may be stored in a financial capture system. A matching algorithm is applied to correlate each settlement record to exactly one approved authorization request. The mechanism for establishing a match may vary depending on the various types of systems and institutions involved. For example, when a reference code or other transaction ID is available in both the settlement record and authorization request, then a match can easily be identified. If no such ID is available, then some combination of other information would be used such as date, time, amount, SE, selecta-card *number, and/or AI number. In typical processing, payments in the direct, primary indirect, and secondary indirect reconciliation will occur only after reconciliation is successful. Exception processing may be necessary to process irreconcilable records.

An exemplary embodiment of the present invention has the capability to handle exceptions to the above-described processing. These exceptions include situations involve, e.g., irreconcilable records and disputes. In such processing, automated or manual process steps may be desired to identify authorization requests and/or settlement records. Cardholder disputes may originate, in which case, the card institution would need to provide information about the selecta-card transaction. For example, a cardholder billing statement might only show "selecta-card" or similar for the merchant, in which case the selecta-card institution might need to generate explanations of charges or initiate disputes to the merchant. The conventional systems and processes would apply here, with the exception that there may be two steps required. For example, an indirect billing dispute would consist of the primary dispute from cardholder to external card institution and then a secondary billing dispute from external card institution to selecta-card institution. As such, the selecta-card institution would retrieve information that it has stored about the transaction, e.g., the authorization request, and possibly correspond with the SE.

Exception handling will also process cases where selecta-card to other card associations may have been changed. This can be done by tracking changes in associations within the lookup table and keeping date time information for all records.

Selecta-card users may optionally be provided with statements reflecting selecta-card usage periodically or by request. If so, the processor 410 of the selecta-card provider, or other system that can access the transactional data from selecta-card transactions, will select all transaction records that utilized the account and/or card of the cardholder for whom a statement is being generated.

Selected records will be appropriately formatted and provided to the selecta-card user by a suitable mechanism such as printing and mailing, on-line statement access, touch tone response, or to an internal cardholder service representative by some sort of console, whereby the cardholder can contact the cardholder service representative by phone or other means in order to obtain statement information.

Similarly, statements may also be provided to any of: card institutions, SE's, entities involved with the use and operation of payment gateway 435 or debit gateway 445, card processing network 303, and/or card processing network 304. These statements may be generated in a similar fashion, although record selection would be based on criteria such as the identity of the card institution, SE, payment gateway 435 or debit gateway 445, card processing network 303, and/or card processing network 304.

By way of examples, the present invention contemplates the following business scenarios:

Business Scenario One: In the first business scenario, the selecta-card provider has a relationship with the card processing network and possibly merchants so that additional costs of the selecta-card transaction processor and transaction fees (and possibly float) can be offset. A likely business scenario is where the card processing network owns and operates the provider. In this first scenario, debit cards would be supported, while other instruments may or may not be supported. In an alternative embodiment, the provider may also be a debit card institution, in which case the system would utilize an internal transaction processor. The cardholder that configures his card associations can select any debit card on the same network as the selecta-card.

Business Scenario Two: In the second business scenario, the selecta-card provider involves a relationship with the card processing network and possibly merchants in order to offset costs as for the first scenario. Furthermore, a relationship with credit and charge card institutions is desired, because in order to support their financial instruments, additional economic exchange is necessary to offset costs. When the cardholder configures his card associations, selectable credit and charge cards may be limited to those for which there exists an equitable business arrangement between provider and card institution. The provider could be such an institution.

Business Scenario Three: In a third business scenario, the selecta-card provider is a card institution that limits the available associations strictly to financial instruments supported by that institution. As such, it can perform direct transactions between the SE and the appropriate financial instrument, which can circumvent issues with float.

Other business scenarios include, for example, the merchant having a preexisting relationship with the selecta-card provider. Fees for usage of the card processing network are paid by virtue of an arrangement between SE, selecta-card institution, and/or associated card institution, and may be passed on in whole or part to any one or more of cardholder, SE, selecta-card institution, associated card institution. Fees such as discount rates and per transaction rates may be charged by selecta-card institution and/or associated card institution. Such fees may be passed on in whole or part to any one or more of cardholder, SE, selecta-card institution, associated card institution. Liabilities such as fraud and/or related irreconcilable charges may be absorbed by any one or more of cardholder, SE, selecta-card institution, associated card institution. Costs, such as the cost of floating payments and fraud costs may be absorbed by any one or more of cardholder, SE, selecta-card institution, associated card institution.

Determination of Card-Present versus Card-Not-Present transaction characteristics, and the resultant fee rate and liabilities may be in accord with preexisting agreement between selecta-card provider 400 and the associated card institution. In the absence of such agreement, the primary transaction from SE to selecta-card institution is considered Card-Present and the transaction from selecta-card institution to associated external institution may be considered Card-Not-Present.

In another embodiment of the present invention, the system and method enables a consumer to use a PIN, biometric, merchant code and/or other indicia to conveniently instruct a financial institution to activate or utilize specific financial services or accounts during a particular time period or during a particular transaction. The PIN (which as used herein may include a cardholder identification number, biometric, merchant code and/or other indicia discussed herein) may be inputted at the POS device 108 and transmitted to a selecta-card provider 400 similar to the embodiments discussed above for the selecta-card number and/or AI number. The selecta-card transaction processor 400, internal transaction processor 250, or any other suitable component may also accept or translate the submitted PIN, biometric, merchant code and/or other indicia to derive, access or implement certain financial services. For example, when making a purchase, the cardholder enters account information into a remote terminal such as a POS device, then the cardholder inputs a particular PIN or biometric which is communicated to the selecta-card processor 400. The selecta-card transaction processor 400 may receive the PIN number, use the PIN number in a look-up table to determine a corresponding instruction or rule and transmit the instruction or rule to a person, financial institution, processor, issuer, emergency service and/or any other entity, as appropriate.

One skilled in the art will appreciate that, in various embodiments, the cardholder may utilize a PIN, biometric, merchant code and/or other indicia in addition to, or in place of, the use of a selecta-card number and/or AI number, as discussed herein. The cardholder may also use a PIN, biometric, merchant code or other indicia to access or derive a selecta-card number and/or AI number. Similarly, the cardholder may use a selecta-card number and/or AI number to access or derive a PIN, biometric, merchant code or other indicia.

Furthermore, different biometric samples may be used to access different services. For example, a left thumb print may indicate a desire to charge the transaction to a particular charge card, while a right thumb print indicates a desire to charge the transaction to a different transaction card.

The financial services may include, for example, selecting a particular account or transaction card, payment instructions, notification instructions, security notifications, specific merchant rules, merchant category rules, geographic rules, expenditure rules or limits, and time or transaction limitations. The PIN may also be used to implement other limitations or restrictions on account usage such as, for example, authorized transactions, authorized goods or services, authorized vendors, stores, and service providers, transaction amount limitation, daily spending limit, authorized geographical area of usage, authorized time of usage, authorized transaction limit for an account, transaction card or automated teller machine account, authorized individual for transacting on an account, one or more banks or financial institutions authorized for the transaction, a limitation of a fee charge on an account, authorized transaction location, and/or authorized number of transactions. The financial services may also include authorization related to an account.

In one embodiment, a particular PIN may instruct the system to charge the transaction to a particular transaction card. For example, PIN 1001 may instruct the system to charge the transaction to the American Express Green Card. Another PIN may instruct the system to provide transaction details to the cardholder via, for example, email, pager, text message, etc. For example, PIN 1002 may instruct the system to still charge the transaction to the American Express Green Card, but to also send an email with transaction details to a particular email address or multiple email addresses. Another PIN may indicate an emergency situation or a request for assistance. In one embodiment, the emergency PIN may route the request directly to emergency services. For example, PIN 1003 may indicate the location of a transaction and/or a request to notify the police that the cardholder is being held at gunpoint.

Moreover, in addition to the PIN, additional cardholder, financial institution and/or merchant input may be obtained or used to modify the request or transaction prior to, during or after the transaction. For example, PIN 1001 may instruct the system to charge all or any portion of the transaction to a first transaction card for transactions below $100, but all or another portion of the transaction to a second transaction card for transactions greater than $100. The PIN may also expire or change rules or limitations after a certain time period. The time period may be random, periodic (e.g., only certain fiscal quarters), set by the cardholder, set by the merchant, set by the issuer or set by the selecta-card system. After the PIN expired, a consumer would need to obtain a new PIN or the account would need to be reset (e.g., after an audit of the account). For example, PIN 1002 may only be valid for up to $500, but becomes invalid in five days. The merchant information may also modify the transaction by, for example, PIN 1001 may instruct the system to charge all or any portion of the transaction to a first transaction card (e.g., personal card) for transactions at a grocery store, but all or another portion of the transaction to a second transaction card (e.g., corporate card) for transactions with an airline.

Location information related to the merchant (e.g., within the merchant code), in addition to the PIN, may also modify the transaction. For example, PIN 1001 may instruct the system to charge all or any portion of the transaction to a first transaction card (e.g., USA card) for transactions in Phoenix, Ariz., but all or another portion of a transaction to a second transaction card (e.g., United Kingdom card) for transactions in London, England. In this embodiment, the system analyzes PIN and merchant code information before determining the appropriate action. For example, PIN 1005 may instruct the system to search for the merchant code to determine the location information.

The rules discussed herein may also be implemented in a hierarchy. For example, a supplemental account for a dependent minor may be limited based on types of charges as defined by the minor using certain PINs, but the overall spending limitation may be defined by the parent based on certain merchant charge types (e.g., maximum of $25 for restaurant transactions and $50 for entertainment transactions). In another example, a small business, corporation, government, military, non-profit or similar organization may establish similar hierarchies based on merchant charge types and similar date restricted PIN's.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical contract optimization or contract compliance system.

What is claimed is:

1. A method for facilitating the request of financial services, said method including:

receiving transaction request information from a cardholder via a remote terminal, wherein said request includes a PIN associated with a financial service in addition to account authorization;

processing said transaction request information and PIN to determine a desired financial service.

2. The method of claim 1 further including activating said desired financial service.

3. The method of claim 1 further including:

receiving transaction request information from a cardholder via a remote terminal, wherein said request comprises a cardholder selecta-card number and an account identification number; and processing said selecta-card number and said account identification number to determine which cardholder transaction account is associated therewith.

4. The method of claim 1 wherein said step of processing said transaction request information and PIN to determine a desired financial service includes a financial service which activates a limitation on an account.

5. The method of claim 1 wherein said step of processing said transaction request information and PIN to determine a desired financial service includes a financial service which activates a limitation on an account, wherein said limitation includes at least one of: selecting a particular account for any portion of the transaction, dividing the payment among various accounts, PIN expiration, payment instructions, notification instructions, security notifications, specific merchant rules, merchant category rules, geographic rules, expenditure rules or limits, time or transaction limitations, authorized transactions, authorized goods or services, authorized vendors, stores, and service providers, transaction amount limitation, daily spending limit, authorized geographical area of usage, authorized time of usage, authorized transaction limit for an account, transaction card or automated teller machine account, authorized individual for transacting on an account, one or more banks or financial institutions authorized for the transaction, a limitation of a fee charge on an account, authorized transaction location, and authorized number of transactions.

6. The method of claim 1 wherein said step of processing said transaction request information and PIN to determine a desired financial service further includes supplementing pre-existing limitations on an account with the desired financial service.

7. The method of claim 1 wherein said step of receiving transaction request information from a cardholder via a remote terminal, wherein said request includes a PIN further includes said PIN including at least one of a cardholder identification, biometric, and merchant code.

* * * * *